(12) United States Patent
May et al.

(10) Patent No.: US 12,058,424 B1
(45) Date of Patent: Aug. 6, 2024

(54) SYSTEM, METHOD, AND COMPUTER PROGRAM FOR A MEDIA SERVICE PLATFORM

(71) Applicant: Amdocs Development Limited, Limassol (CY)

(72) Inventors: Pavel Yefim May, Rishon leZion (IL); Vladimir Tkach, Kefar Yona (IL); Sergey Podalov, Herzliya (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 18/092,843

(22) Filed: Jan. 3, 2023

(51) Int. Cl.
*H04N 21/8541* (2011.01)
*G06F 16/71* (2019.01)
*G06F 16/735* (2019.01)
*G06F 16/738* (2019.01)

(52) U.S. Cl.
CPC ......... *H04N 21/8541* (2013.01); *G06F 16/71* (2019.01); *G06F 16/735* (2019.01); *G06F 16/739* (2019.01)

(58) Field of Classification Search
CPC ... H04N 21/8541; G06F 16/71; G06F 16/739; G06F 16/735
See application file for complete search history.

(56) References Cited

U.S. PATENT DOCUMENTS

| | | |
|---|---|---|
| 8,121,198 B2 | 2/2012 | Thambiratnam et al. |
| 9,204,184 B2 * | 12/2015 | Ellis ................... H04N 21/4882 |
| 11,582,536 B2 * | 2/2023 | Packard ............... H04N 21/278 |
| 2004/0125877 A1 | 7/2004 | Chang et al. |
| 2005/0022252 A1 | 1/2005 | Shen |
| 2010/0251305 A1 * | 9/2010 | Kimble .............. H04N 7/17318 725/46 |
| 2013/0283162 A1 * | 10/2013 | Aronsson ............. G11B 27/105 715/719 |
| 2014/0082091 A1 | 3/2014 | Rexer |
| 2022/0360835 A1 * | 11/2022 | Everett .............. H04N 21/2668 |

FOREIGN PATENT DOCUMENTS

| | | |
|---|---|---|
| CN | 113094547 A | 7/2021 |
| WO | 2013070802 A1 | 5/2013 |

OTHER PUBLICATIONS

20th Century Studios, "Morgan / IBM Creates First Movie Trailer by AI [HD] / 20th Century Fox," YouTube, Aug. 31, 2016, 5 pages, retrieved from https://www.youtube.com/watch?v=gJEzuYynaiw.
Wikipedia, "Over-the-top media service," Wikipedia, 2023, 6 pages, retrieved from https://en.wikipedia.org/wiki/Over-the-top_media_service.
Openai, "Transforming work and creativity with AI," OpenAI, 2023, 22 pages, retrieved from https://openai.com/api/.

(Continued)

*Primary Examiner* — Nnenna N Ekpo
(74) *Attorney, Agent, or Firm* — Zilka-Kotab, P.C.

(57) ABSTRACT

As described herein, a system, method, and computer program are provided for a media service platform. A media content is parsed to a directed graph, where vertices of the directed graph correspond to entities in the media content and edges of the directed graph define relationships between the entities. One or more creative media capability services are provided, using the directed graph.

20 Claims, 11 Drawing Sheets

(56) References Cited

OTHER PUBLICATIONS

AWS "Amazon Comprehend," Amazon, 2023, 8 pages, retrieved from https://aws.amazon.com/comprehend/.
Google Cloud, "Cloud Natural Language documentation," Google Cloud, 2023, 6 pahes, retrieved from https://cloud.google.com/natural-language/docs.
Microsoft, "Text analytics," Microsoft Azure, 2023, 7 pages, retrieved from https://azure.microsoft.com/en-us/products/cognitive-services/text-analytics/.
IBM, "Watson Natural Language Understanding," IBM, 2023, 13 pages, retrieved from https://www.ibm.com/cloud/watson-natural-language-understanding.
AWS, "Amazon Rekognition Video," Amazon Rekognition, 2023, 11 pages, retrieved from https://aws.amazon.com/rekognition/video-features/.
Google Cloud, "Video AI," Google Cloud, 2023, 11 pages, retrieved from https://cloud.google.com/video-Intelligence.
Microsoft, "Unlock video insights," Microsoft Azure Video Indexer, 2022, 8 pages, retrieved from https://vi.microsoft.com/en-us.
AWS, "Transcribing streaming audio," Amazon Transcribe, 2023, 2 pages, retrieved from https://docs.aws.amazon.com/transcribe/latest/dg/streaming.html.
Google Cloud, "Speech-to-Text," Google Cloud, 2023, 11 pages, retrieved from https://cloud.google.com/speech-to-text.
AWS, "Kinesis Video Stream Parser Library," Amazon Kinesis Video Streams, 2023, 2 pages, retrieved from https://docs.aws.amazon.com/kinesisvideostreams/latest/dg/parser-library.html.
AWS, "Amazon Rekognition Image," Amazon Rekognition, 2023, 7 pages, retrieved from https://aws.amazon.com/rekognition/image-features/.
Google Cloud, "Cloud Vision documentation," Google Cloud, 2023, 9 pages, retrieved from https://cloud.google.com/vision/docs/.
Harvey, M., "Five video classification methods implemented in Keras and TensorFlow," Coastline Automation, Mar. 21, 2017, 24 pages, retrieved from https://blog.coast.ai/five-video-classification-methods-implemented-in-keras-and-tensorflow-99cad29cc0b5.
Sharma, P., "Deep Learning Tutorial to Calculate the Screen Time of Actors in any Video (with Python codes)," Analytics Vidhya, Sep. 11, 2018, 18 pages, retrieved from https://www.analyticsvidhya.com/blog/2018/09/deep-learning-video-classification-python/.
Apriorit, "Applying Long Short-Term Memory for Video Classification," apriorit, Apr. 11, 2019, 21 pages, retrieved from https://www.apriorit.com/dev-blog/609-ai-long-short-term-memory-video-classification.
Garcia-Garcia et al., "A survey on deep learning techniques for image and video semantic segmentation," Applied Soft Computing, vol. 70, 2018, pp. 41-65.
Maksymenko, S., "Deep Learning-based Real-time Video Processing," KDnuggets, 2023, 15 pages, retrieved from https://www.kdnuggets.com/2021/02/deep-learning-based-real-time-video-processing.html.

\* cited by examiner

SYSTEM, METHOD, AND COMPUTER PROGRAM FOR A MEDIA SERVICE PLATFORM

FIELD OF THE INVENTION

The present invention relates to providing creative content capability services for existing media content.

BACKGROUND

There is an enormous corpus of unstructured information hidden in media streams and files stored worldwide. Existing media services, such as Youtube, Vimeo, Amdocs Vubiquity and other over-the-top (OTT) media services, provide out of the box a very limited set of media creative capabilities for targeted end users. For example, currently provided capabilities do not allow composing automatically a new media based on a set of media fragments found and filtered as per end user preferences. Additionally, producing a new media based on episodes from existing medias is extremely time-consuming and labor-intensive process. Further, contextual navigation and search of existing media services do not provide discovering of potential relationships between different media and their fragments, events, or personages.

The limitations on media creative capabilities are primarily due to the unstructured nature of the world-scale media corpus. There is thus a need for addressing these and/or other issues associated with the prior art.

SUMMARY

As described herein, a system, method, and computer program are provided for a media service platform. A media content is parsed to a directed graph, where vertices of the directed graph correspond to entities in the media content and edges of the directed graph define relationships between the entities. One or more creative media capability services are provided, using the directed graph.

DETAILED DESCRIPTION

Figure 1:
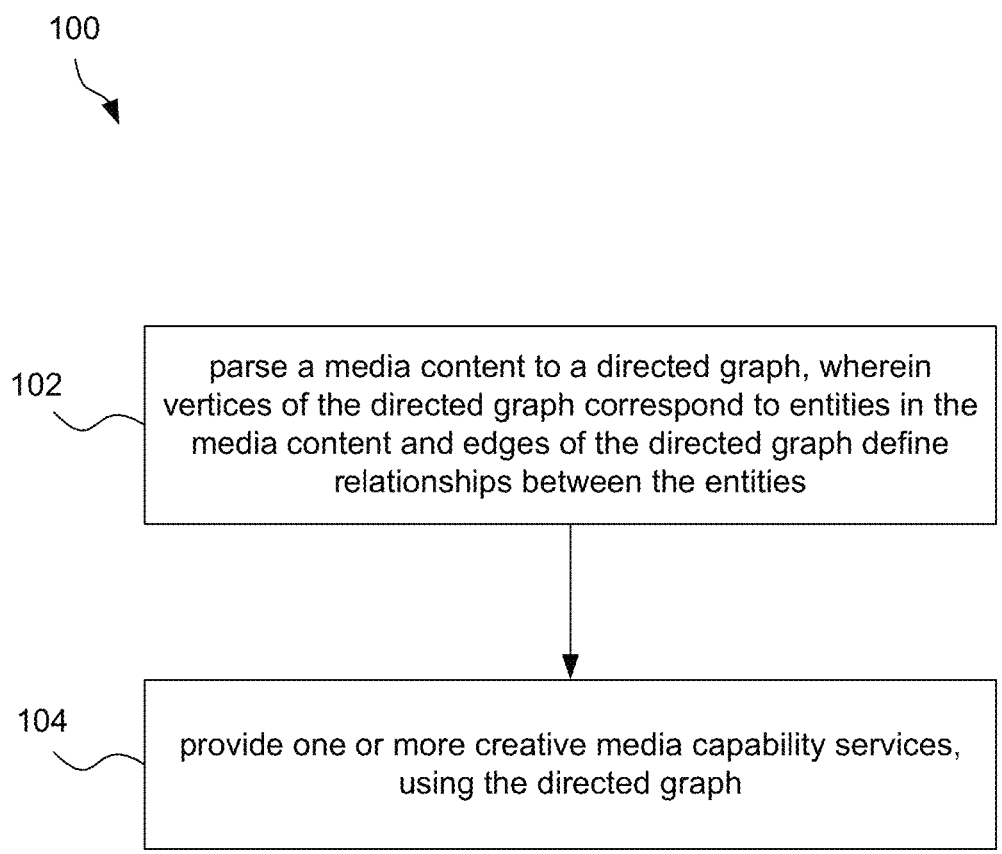
FIG. 1 illustrates a method for providing one or more creative media capability services, in accordance with one embodiment.

FIG. 1 illustrates a method 100 for providing one or more creative media capability services, in accordance with one embodiment. The method 100 may be performed by any computer system described below with respect to FIGS. 9 and/or 10. For example, the method 100 may be performed by one or more computer systems (e.g. in the cloud) implementing a platform on which the creative media capability service(s) are provided.

In operation 102, a media content is parsed to a directed graph, where vertices of the directed graph correspond to entities in the media content and edges of the directed graph define relationships between the entities. With respect to the present description, the media content refers to any existing media content capable of being consumed (e.g. viewed, listened to, etc.) by an end user via a device (e.g. mobile device) of the end user. For example, the media content may be a movie, a television episode, an audible book, etc.

In an embodiment, the media content is a media file. In another embodiment, the media content is a media stream. The media content may be one of a plurality of media contents accessed from different media sources, such as different media repositories and/or different media providers. For example, the media contents may be scraped from the different media sources which may be publicly available.

As mentioned above, the media content is parsed to a directed graph. In an embodiment, the media content may be parsed using a plurality of different types of parsers, such as parsers for soundtracks, videos, audio, text, images, emotions (sentiments), media production documents, etc. In an embodiment, the media content may be parsed using a plurality of different parsers, such as parsers provided by a plurality of different cloud and/or on-premises platforms.

The media content is parsed to retrieve the raw data therefrom, which is then processed to form the directed graph, in an embodiment. With respect to the present description, the directed graph includes a plurality of vertices that correspond to entities in the media content, as well as a plurality of edges that define relationships between the entities. The entities may be any tangible or intangible features of a media content, such as a personage, object, phrase, location, emotion, intimacy, concept, event, music, and/or relationship. The relationships between the entities may be determined as a result of interaction with the entities in the media content, entities detected at a same timepoint in a media content, etc., for example. Thus, the directed graph may be stored as metadata for the media content. It should be noted that operation 102 may be performed for each of a plurality of media contents, to form a directed graph per media content.

In operation 104, one or more creative media capability services are provided, using the directed graph. The creative media capability services refer to any services configured to provide some functionality based on the data included in the directed graph. In an embodiment, the creative media capability services may be provided on a single platform, which may be separate from the media content providers (i.e. provided by a third party). In an embodiment, the method 100 may also include indexing the directed graph, where at least one of the creative media capability services uses the index to provide some functionality.

In an embodiment, the creative media capability services may include a search engine that provides searching and filtering of the media content. In an embodiment, the creative media capability services may include generating a story timeline and its visualization for the media content. In an embodiment, the creative media capability services may include live filtering out of predefined content from the media content per a predefined filter setting. In an embodiment, the creative media capability services may include composing a new media from the media content, or from one or more of the plurality of media contents (i.e. using the directed graphs formed for those media contents).

In an embodiment, the creative media capability services may include navigating within the media content. In an embodiment, the creative media capability services may include composing a contraction of the media content. In an embodiment, the creative media capability services may include providing concomitant recommendations synchronized with the media content when being currently watched. In an embodiment, the creative media capability services may include generating an alternative story continuation beginning from any point of a scenario in the media content.

In an embodiment, the one or more creative media capability services may be made accessible to a plurality of end users. Optionally, the end users may have subscription-based accounts with the platform on which the creative media capability service(s) are provided. The one or more creative media capability services may be made accessible to the end users by receiving, from an end user of the plurality of end users, a request for a creative media capability service of the one or more creative media capability services, and executing functionality of the creative media capability service to provide a result to the end user.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Glossary

The following terms and corresponding definitions may apply to the description of the embodiments below.

Machine Learning (ML)—the scientific study of algorithms and statistical models that computer systems use to perform a specific task effectively without using explicit instructions, relying on patterns and inference instead. It is seen as a subset of artificial intelligence.

OTT— over-the-top media service offered directly to viewers via the Internet. OTT bypasses cable, broadcast, and satellite television platforms; the types of companies that traditionally act as controllers or distributors of such content.

OpenAI GPT—performs a variety of natural language tasks, Codex, which translates natural language to code.

Structuration—the interrelation of parts in an organized whole.

Semantic—Semantic is used to describe things that deal with the meanings of words and sentences.

Soundtrack—a movie sound.

Semantic Entity—object detected in media like personage, phrase, location, emotion, intimacy, music, relationship, "Easter eggs", etc. —see more below. "Semantic" relates to the fact, that the entity is stored with its relationships, thus adding the meaning of that entity.

Semantic Media Layer Graph—a structured information media file/stream metadata (model) that has the form of a directed graph, the vertices of which correspond to the entities of the media, and the arcs (edges) define the relations between them. This information model is stored along with other data of the media file and is indexed in a global or specified search engine. Media semantic entities can be personages, objects, emotions, concepts, events, properties, processes. Thus, Semantic Media Layer Graph reflects the semantics of the media in the form of semantic entities and relationships. Graph for Media Semantic Layer Entities Graph can be stored in any linked data formats like N-Triples, RDF Turtle, JSON-LD, etc. and persisted in any graph database.

RDF— relates to Resource Description Framework graph.

N-Triples—a format for storing and transmitting data. It is a line-based, plain text serialization format for RDF.

Semantic Media File Add-on Metadata Format—the suggested new format of media that additionally to raw media data contains Semantic Media Layer Graph data. This format is suggested to be adopted globally as industry-wide media add-on metadata format standard for media semantization, exploration, composition, and navigation.

Semantic Media Entities Relationships—relationships detected between various semantic media layer graph entities like personages or locations.

Media Service—service provided by media content distributors like Youtube, Vimeo, Amdocs Vibiquity, and any other media distributors.

Summary

There is an enormous corpus of unstructured information hidden in media streams and files stored worldwide. Existing media services like Youtube, Vimeo, Amdocs Vibiquity and other over-the-top (OTT) media services provide out of the box a very limited set of media creative capabilities for targeted end users.

For example, provided capabilities do not allow composing automatically a new media based on a set of media fragments found and filtered as per end user preferences.

Producing a new media based on episodes from existing medias is extremely time-consuming and labor-intensive process because of unstructured nature of world-scale media corpus.

Contextual navigation and search of existing media services do not provide discovering of potential relationships between different media and their fragments, events, or personages.

Existing media services also lack the following creative capabilities:

Unable to convert media to scenario script by using machine learning NLP tools like OpenAI GPT and other similar, etc. (getting "what I watch").

Unable to predict an alternative story continuation beginning from any point of a scenario timeline extracted from a media file or stream. E.g., An alternative story continuation can begin from any point of a scenario or story timeline based on Semantic Media Layer Graph Entities data of a specific media file or stream.

Unable to provide concomitant links relevant to currently watched media episode content. E.g., Providing concomitant recommendations synchronized with currently watched media episode to other customers, marketers, media producers by linking of Semantic Media Layer Graph Entities and an accumulated data of the specific customer profile.

Unable to predict context advertisement based on media concomitant recommendations.

Unable to generate concomitant Point of Sale for products relevant to currently watched media. E.g., Providing Point of Sale service related to the currently viewed episodes based on related entities of Semantic Media Layer Graph. This service is enabled by on-the-fly generated "This" or "Like This" shopping picture-in-picture on TV screen or media frames.

The embodiments disclosed herein improve upon the limitations of the prior art by providing a Media Scripting and Synthesizing Platform having creative media capabilities for over-the-top (OTT) media services, such as:

1) Converting media to scenario script by using NLP and ML (getting "what I watch"), including the following capabilities:

a) Generating network relationships between media entities and their map visualization of a specific media file or stream.

b) Generating story timeline and its visualization based on Semantic Media Layer Graph Entities data of a specific media file or stream.

c) Live filtering out of streaming content as per predefined settings for violence, adult content, age limited content, etc., for example, for parental control. Prohibited episodes may be replaced with alternative content.

d) Predicting an alternative story continuation beginning from any point of a scenario based on Semantic Media Layer Graph Entities data of a specific media file or stream.

e) Providing concomitant recommendations as accompanying information relevant to currently watched media episode.

f) Predicting a key phrase artifact of the specific media based on Semantic Media Layer Graph Entities data or any available 3rd-party API (for example, assigning high rank to "Nobody is perfect!" phrase in "Some Like It Hot" (1959) glorious movie).

2) Viewing and navigating media using Semantic Media Layer Graph Entities data.

3) Generating concomitant Point of Sale for products relevant to currently watched media semantic entities as well as to all available media semantic entities of the specific media.

Media Scripting and Synthesizing Platform solution is based on the Semantic Media Layer Graph. When being a media add-on metadata, the Semantic Media Layer Graph is produced by applying two types of available technologies for media corpus parsing and structuration:

1) Applicable when a set of media production documents IS NOT available—there are several public cloud-based Machine Learning tools.

2) Applicable when a set of media production documents IS available—there is a few patented technologies to be utilized.

As described herein, a media file or stream is parsed to our Semantic Media Layer Graph using the above mentioned above tools and technologies.

The Semantic Media Layer Graph of media may be globally adopted as an industry-wide media add-on metadata format standard. This standard can also be adopted by a single media service provider.

Having the media corpus enriched with Semantic Media Layer Graph media add-on metadata, this format enables monetization of creative media capabilities as a paid service including exploring, navigating, composing new media, and other services provided by the suggested Media Scripting and Synthesizing Platform across the entire media corpus.

Figure 2:
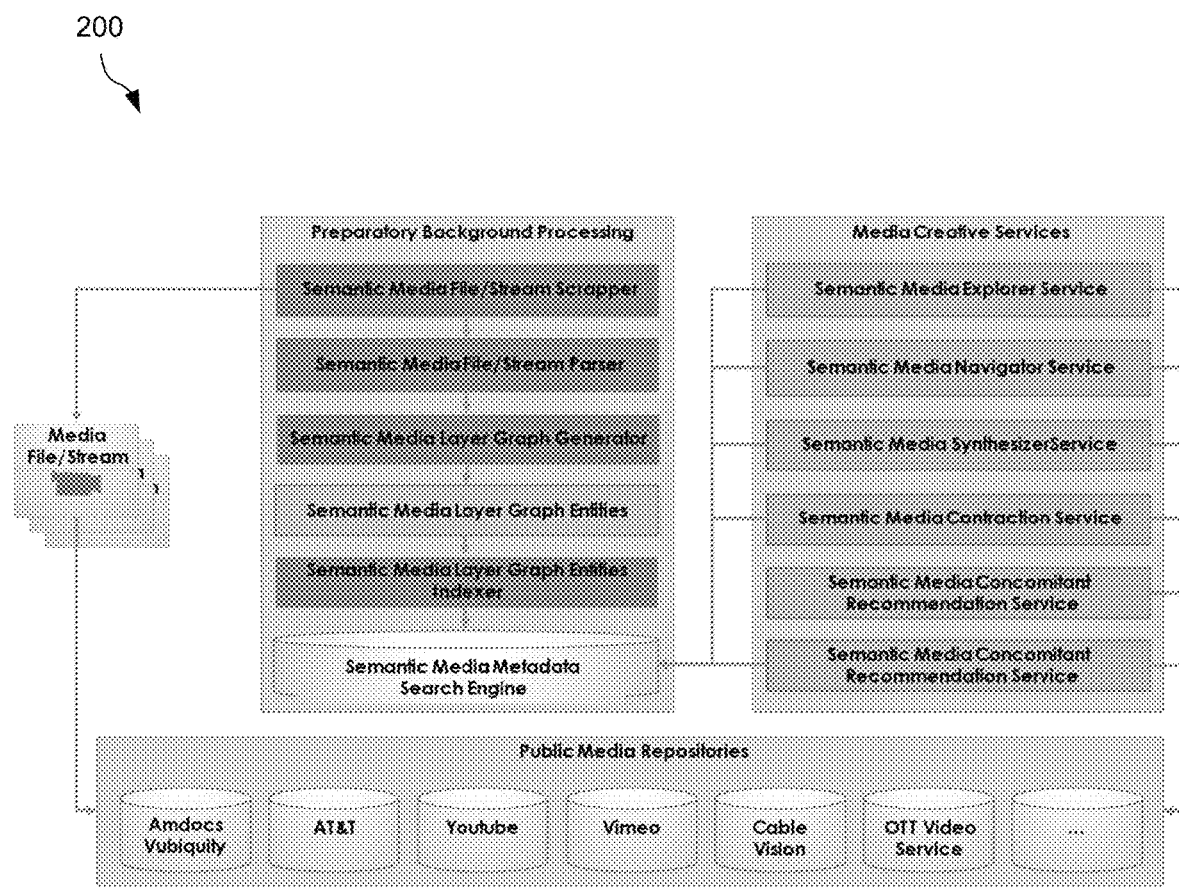
FIG. 2 illustrates a block diagram of a system for providing one or more creative media capability services, in accordance with one embodiment.

FIG. 2 illustrates a block diagram of a system 200 for providing one or more creative media capability services, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the Media Scripting and Synthesizing Platform includes the following components:

1) Media Data Processing Preparatory Background Processing Services:

a) Semantic Media File/Stream Scrapper—scraps media files or streams one by one from publicly available media services like Youtube, Vimeo, etc.

b) Semantic Media File/Stream Parser—to parse media file or stream to Semantic Media Layer Graph Entities data by analyzing and parsing its media file/stream with assistance of available public cloud-based tools and patented technologies mentioned above.

c) Semantic Media Layer Graph Generator—to generate relationships of Semantic Media Layer Graph Entities in a data format used in semantic technologies, for example linked data format (N-Triples format for Resource Description Framework graphs).

d) Semantic Media Layer Graph Entities Indexer—indexes Semantic Media Layer Graph Entities data in the platform search engine.

2) End User Media Creative Services:

a) Semantic Media Explorer—explores entire media corpus by semantic searching and filtering medias using search options provided by Semantic Media Layer Graph Entities.

b) Semantic Media Synthesizer—composes a new media consisting of episodes from one or multiple medias by semantic searching and/or filtering Semantic Media Layer Graph Entities data.

c) Semantic Media Navigator—navigates a single media file or stream and navigates inside this single media using semantic search options provided by Semantic Media Layer Graph Entities data.

d) Semantic Media Contraction Service—composes a contraction of a single media file or stream using semantic search options provided by Semantic Media Layer Graph Entities data.

e) Semantic Media Concomitant Recommendation Service—provides concomitant recommendations synchronized with a currently watched media episode content.

f) Alternative Story Continuation Service—generates (predicts) an alternative story continuation(s) beginning from any point of a scenario based on Semantic Media Layer Graph Entities data of a specific media file or stream.

Figure 3A:
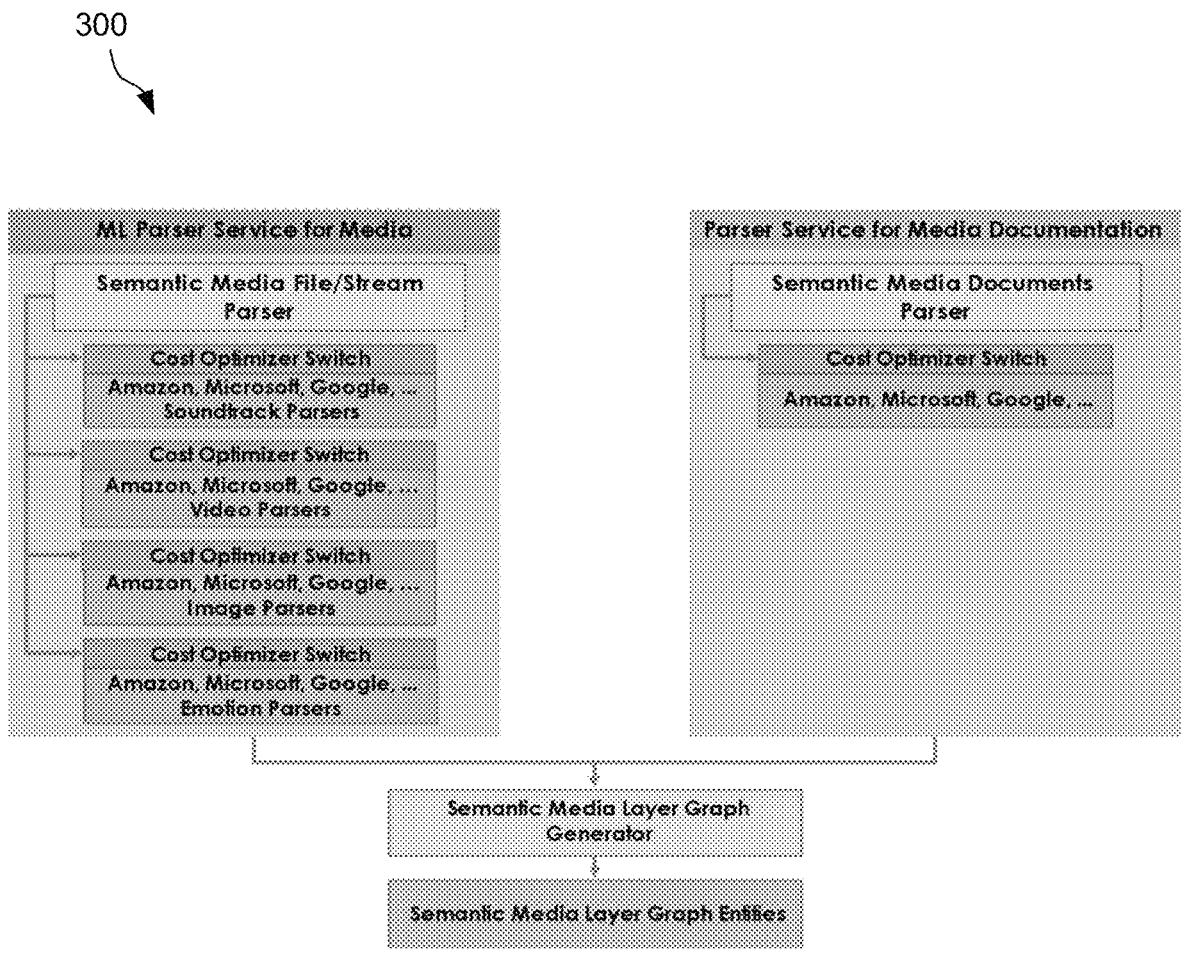
FIG. 3A illustrates a block diagram of a system for parsing a plurality of media contents to a directed graph, in accordance with one embodiment.

FIG. 3A illustrates a block diagram of a system 300 for parsing a plurality of media contents to a directed graph, in accordance with one embodiment. As an option, the system 300 may be implemented in the context of the details of the previous figure and/or any subsequent figure(s). Of course, however, the system 300 may be implemented in the context of any desired environment. Further, the aforementioned definitions may equally apply to the description below.

The Semantic Media File/Stream Parser parses each media file or stream into a raw data which is transformed into Semantic Media Layer Graph Entities data by Semantic Media Layer Graph Generator.

The Semantic Media File/Stream Parser is built as a multi-parser and multi-cloud processor utilizing existing public cloud-based tools mentioned above. This processor automatically switches processing for each parser type between providers of available cloud or on premises parser services according to their current minimal cost of operation for the specific parser type.

The parsers may include the following parser types:
Soundtrack
Video
Audio
Text
Image
Emotion (Sentiment)
Media production documents The set of parser types and corresponding set of Cost Optimizer Switches is expandable as per availability of public or custom services for media parsing and structuration.

Figure 3B:
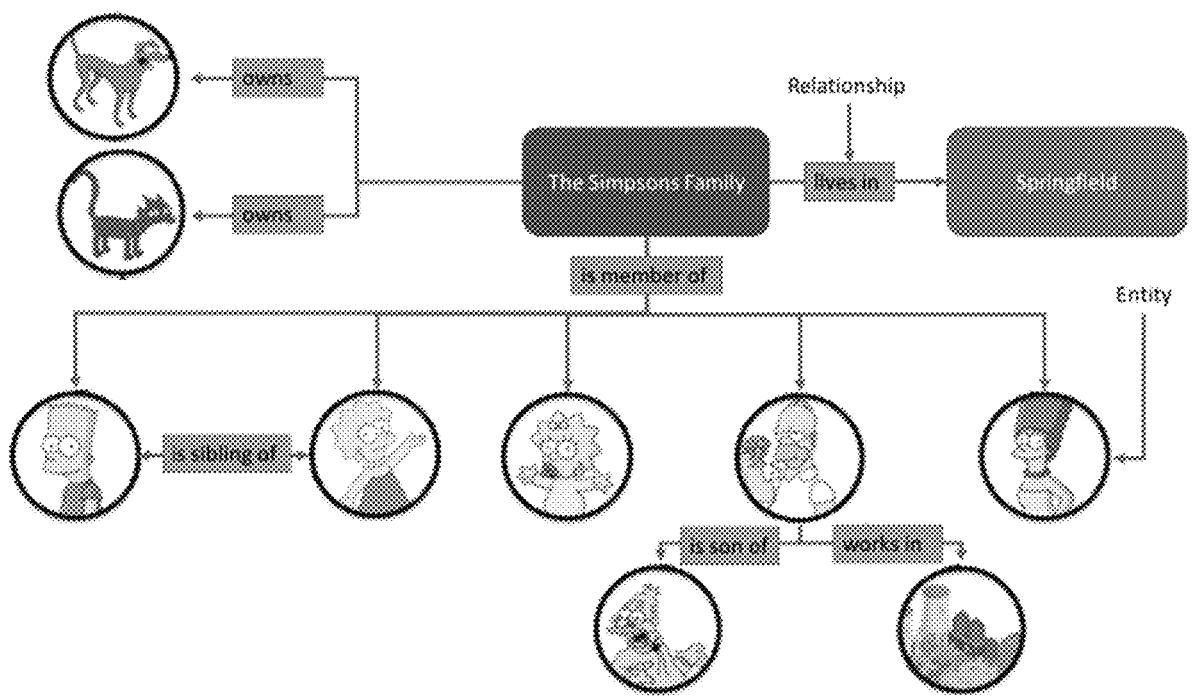
FIG. 3B illustrates entities and relationships defined in a directed graph, in accordance with one embodiment.

FIG. 3B illustrates entities and relationships defined in a directed graph, in accordance with one embodiment. As an option, the embodiment shown herein may be implemented in the context of the details of the previous figure and/or any subsequent figure(s). Of course, however, the embodiment shown herein may be implemented in the context of any desired environment. Further, the aforementioned definitions may equally apply to the description below.

The Semantic Media Layer Graph entities of each media file or stream is indexed and stored in the platform search engine and thus becomes immediately available (e.g. to all authorized customers as per their subscription level). Relationships between semantic entities are built as per each semantic entity appearance in media episodes through the entire media file/stream.

For example, relationship between two or more personages or other entities can be established when:
Personages appear in the same episode
A personage mentions name of another personage
A personage appears at a specific location
A personage appears a location that he mentioned A relationship between two or more personages or other entities is ranked as per the assigned relationship metrics, for example:
Frequency
Duration
Relationship Type:
One-to-One
One-to-Many
Many-to-Many
Intimacy rate
Indoors
Outdoors As a resulting output of media semantic layer processing, the Semantic Media Layer Graph of a specific media can visualize network relationships of its semantic entities:
Personages
Phrases
Places
Emotions (Sentiments)
Events
Etc.

Figure 4:
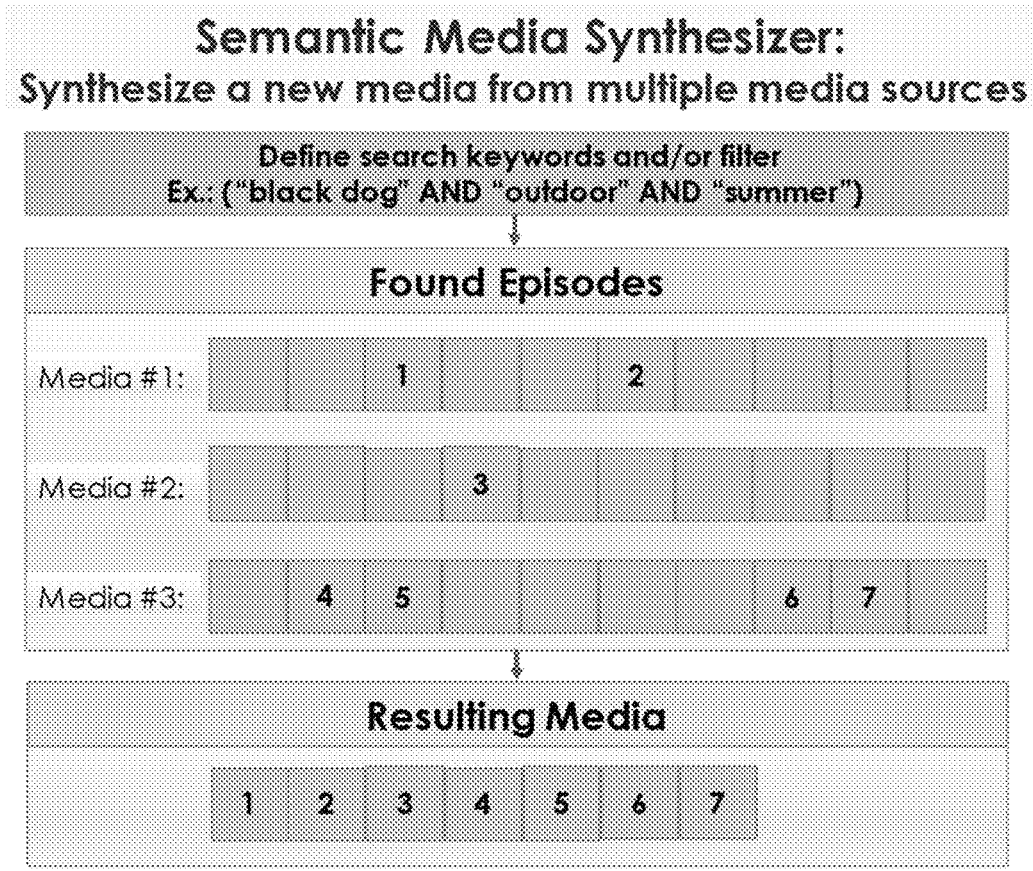
FIG. 4 illustrates an exemplary implementation of a creative media capability service that composes a new media from one or more of a plurality of media contents, in accordance with one embodiment.

FIG. 4 illustrates an exemplary implementation of a creative media capability service that composes a new media from one or more of a plurality of media contents, in accordance with one embodiment. As an option, the embodiment shown herein may be implemented in the context of the details of the previous figure and/or any subsequent figure(s). Of course, however, the embodiment shown herein may be implemented in the context of any desired environment. Further, the aforementioned definitions may equally apply to the description below.

New media, consisting of media episodes from one or multiple movies, may be composed by specifying the Semantic Media Layer Graph Entities used for search and/or filtering, for example:

Composing media sequence of episodes with the same actor

Composing media sequence with entries of searched text

Composing media sequence with specified cars and/or persons

Composing media sequence with specified locations and/or daytime

Composing media sequence with specified emotions (sentiments)

A media sequence may be composed with Machine Learning Natural Language Processing assistance. NLP will suggest a more effective set of search/filtering parameters and thus better choosing of relevant episodes.

Figure 5A:
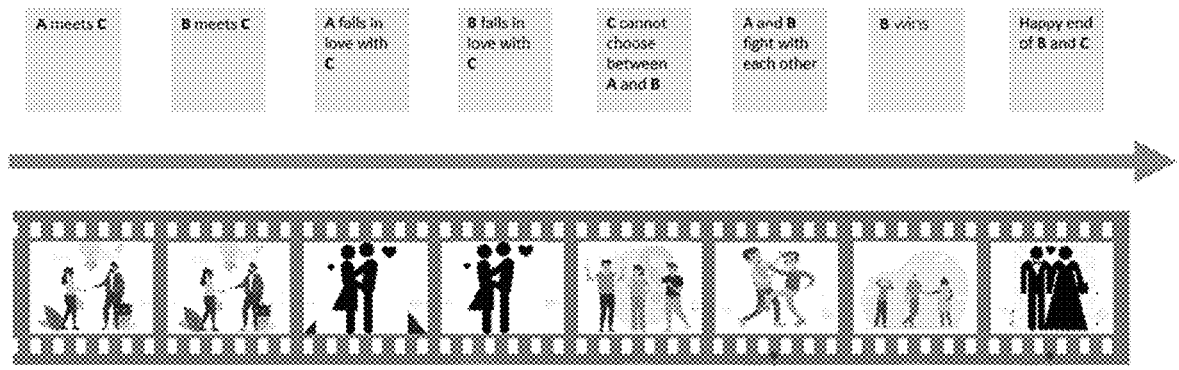
FIG. 5A illustrates an exemplary implementation of a creative media capability service that generates a story timeline and its visualization for a media content, in accordance with one embodiment.

FIG. 5A illustrates an exemplary implementation of a creative media capability service that generates a story timeline and its visualization for a media content, in accordance with one embodiment. As an option, the embodiment shown herein may be implemented in the context of the details of the previous figure and/or any subsequent figure(s). Of course, however, the embodiment shown herein may be implemented in the context of any desired environment. Further, the aforementioned definitions may equally apply to the description below.

As mentioned above, a media content is analyzed to a required depth of details (e.g. depending on customer profiles and available compute resources). For example, the hierarchy of Semantic Media Layer Graph Entities shown in Table 1 can be recognized.

TABLE 1

1. Episodes (media segmentation by semantic scenes)
2. Personages
   a. Name
   b. Age
   c. Gender
   d. Language
   e. Profession
   f. Etc.

TABLE 1-continued

3. Can be provided by IMDBPro service (see pro.imdb.com):
   a. Genre
   b. Actor names
   c. Locations
   d. Etc.
4. Text fragments (phrases)
5. Objects
   a. Home: house/villa/apartment/shack/etc.
   b. Furniture: bed/closet/etc.
   c. Vehicle: car/plane/boat/yacht/spaceship/etc.
   d. Animal: cat/dog/etc.
6. Music fragments (songs, compositions) - can be recognized by Shazam service
7. Languages
8. Actions as per type:
   a. A single conversation
   b. Friendship
   c. Cooperation (like working together)
   d. Love
   e. Threat
   f. Violent actions
      i. Fight
      ii. Boxing round
      iii. Shooting
      iv. Car accident
      v. Nature cataclysms
9. Clothes (brand names)
10. Places
11. Day time
12. Emotions
    a. Happiness
    b. Unhappiness
    c. Cry
    d. Laugh
13. Events
    a. Sport Event: soccer/football/basketball/chess/gymnastics/tai chi/martial art/etc.
    b. Parade
14. Sound effects
    a. Speech
    b. Silence
    c. Applause
    d. Shot
    e. Dispute
    f. Music: singing/playing/chorus/etc.
    g. Thunder
    h. Siren
    i. Car accident
15. Weather
    a. Rain
    b. Sun
    c. Cloud
    d. Hot
    e. Cold
16. Season
    a. Winter
    b. Spring
    c. Summer
    d. Autumn Table 2 illustrates an example of the Semantic Media Layer Graph Entities in YAML format.

TABLE 2 title: 'Motherless Brooklyn'
year: 2019
genre: 'crime, drama'
director: 'Edward Norton'
stars:
  - 'Bruce Willis'
  - 'Ethan Suplee'
  - 'Willem Dafoe'
places:
  - 'place #1'
  - 'place #1'
  - rolls-royce
sound:
  - '#1'
  - '#2'
  - '#3'
episodes:
  - name: 'episode #1'
    personages:
      - {actor: 'Bruce Willis', role: 'Frank Minna', replicas: [{timestamp: 1000, text: bla-bla-bla, action: {type: conversation}, place: {name: 'place #1', type: indoor}, sound: '#1', emotion: calm, relationships: {type: many2many, roles: [{role: 'Paul Randolph', duration: 5, intimacy_rate: normal}, {role: 'Lionel Essrog', duration: 10, intimacy_rate: normal}]}}, {timestamp: 2000, text: bla-bla-bla, action: {type: conversation}, place: {name: place2, type: outdoor}, emotion: quiet}]}
      - {actor: 'Willem Dafoe', role: 'Paul Randolph', replicas: [{timestamp: 1500, text: bla-bla-bla, action: {type: conversation}, place: {name: rolls-royce, type: car}, emotion: angry, relationships: {type: many2many, roles: [{role: 'Frank Minna', duration: 5, intimacy_rate: normal}, {role: 'Lionel Essrog', duration: 15, intimacy_rate: normal}]}}, {timestamp: 2500, text: bla-bla-bla, action: {type: conversation}, place: place2, emotion: calm}]}

Table 3 illustrates an exemplary scenario from a media content, which can be composed and viewed as a story timeline as illustrated in FIG. 5A.

TABLE 3

1. 'A meets C'
2. 'B meets C'
3. 'A falls in love with C'
4. 'B falls in love with C'
5. 'C cannot choose between A and B'
6. 'A and B fight with each other'
7. 'B wins'
8. 'Happy end of B and C'

Figure 5B:
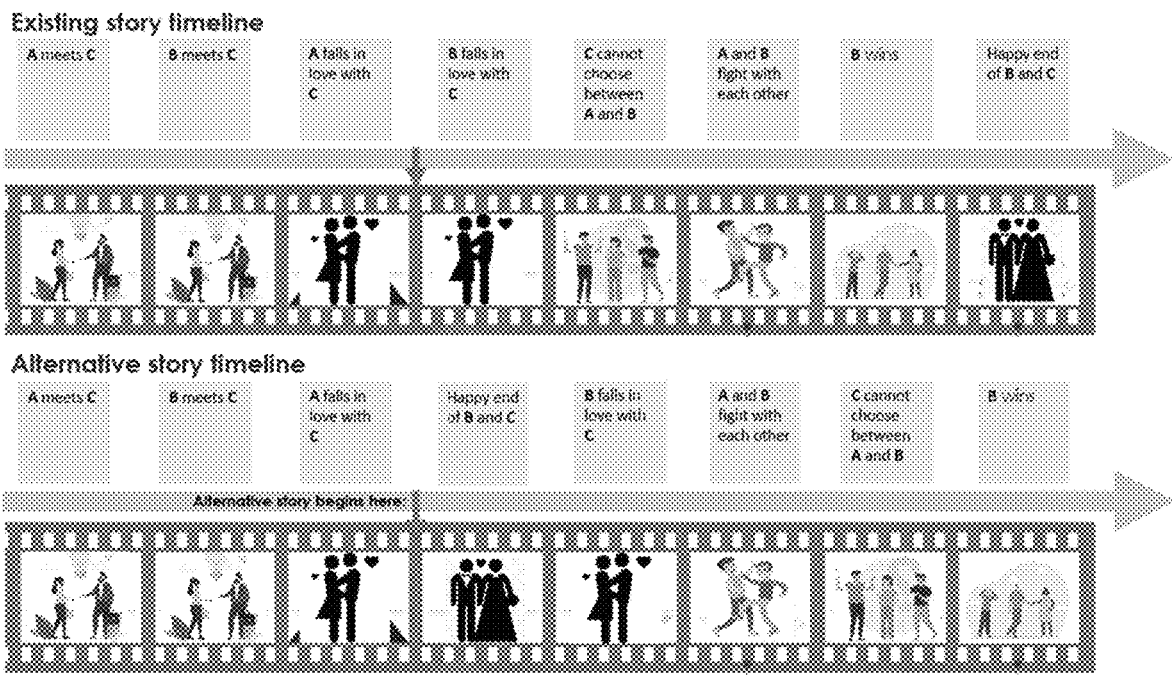
FIG. 5B illustrates an exemplary implementation of a creative media capability service that generates an alternative story continuation beginning from any point of a scenario in a media content, in accordance with one embodiment.

FIG. 5B illustrates an exemplary implementation of a creative media capability service that generates an alternative story continuation beginning from any point of a scenario in a media content, in accordance with one embodiment. As an option, the embodiment shown herein may be implemented in the context of the details of the previous figure and/or any subsequent figure(s). Of course, however, the embodiment shown herein may be implemented in the context of any desired environment. Further, the aforementioned definitions may equally apply to the description below.

An alternative story continuation can begin from any point of a scenario or story timeline based on the Semantic Media Layer Graph Entities of a specific media file or stream. End user can choose any moment of watched media and generate alternative continuations.

This feature will utilize a Machine Learning linear regression model trained on data of Semantic Media Layer Graphs of similar media. Such a model will be able to predict the existing story future continuation(s) from a chosen point. To increase quality of prediction the set of similar media will be filtered by a specified region, country, religion, age, etc.

Figure 6:
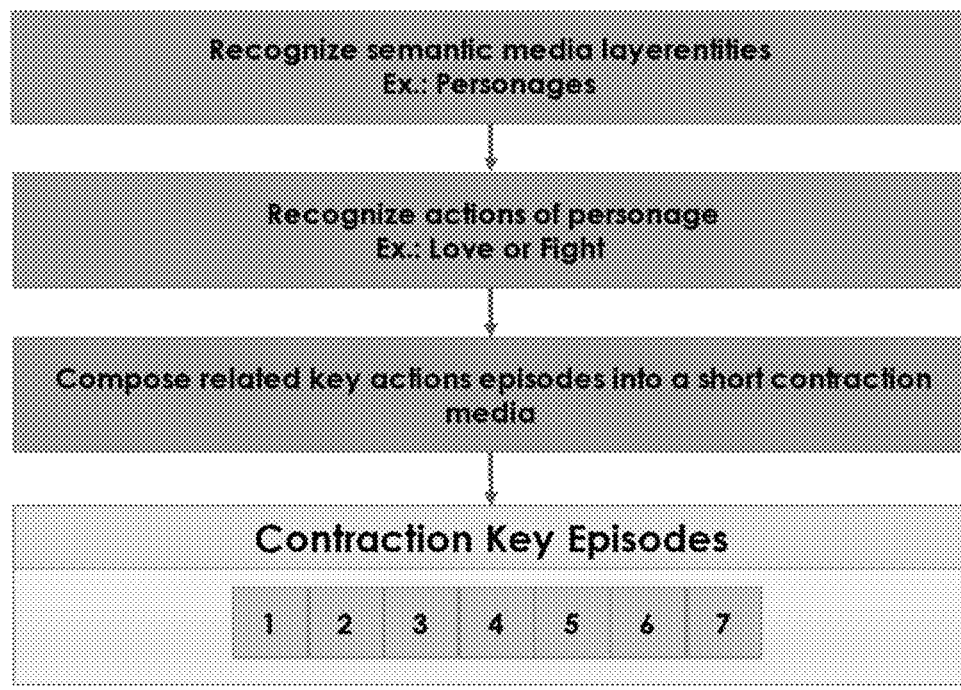
FIG. 6 illustrates an exemplary implementation of a creative media capability service that composes a contraction of a media content, in accordance with one embodiment.

FIG. 6 illustrates an exemplary implementation of a creative media capability service that composes a contraction of a media content, in accordance with one embodiment. As an option, the embodiment shown herein may be implemented in the context of the details of the previous figure and/or any subsequent figure(s). Of course, however, the embodiment shown herein may be implemented in the context of any desired environment. Further, the aforementioned definitions may equally apply to the description below.

Figure 7:
FIG. 7 illustrates an exemplary implementation of a creative media capability service that provides concomitant recommendations synchronized with a currently watched media content, in accordance with one embodiment.

In an embodiment, media contraction may be synthesized, using the Semantic Media Layer Graph Entities, based on an action flow of personages. For example:

X meets Z
Y meets Z
X falls in love with Z
Y falls in love with Z
Z cannot choose between X and Y
X and Y fight with each other
Y wins
Happy end of Y and Z FIG. 7 illustrates an exemplary implementation of a creative media capability service that provides concomitant recommendations synchronized with a currently watched media content, in accordance with one embodiment. As an option, the embodiment shown herein may be implemented in the context of the details of the previous figure and/or any subsequent figure(s). Of course, however, the embodiment shown herein may be implemented in the context of any desired environment. Further, the aforementioned definitions may equally apply to the description below.

The following (e.g. monetization) add-on services may be provided:

Advertising relevant products or services related to the currently streamed episodes (e.g. as per specific subscription level).

Providing Point of Sale service related to the currently viewed episodes based on related entities of Semantic Media Layer Graph. This service is enabled by on-the-fly generated "This" or "Like This" shopping picture-in-picture on TV screen or media frames. See the following examples:

Buy these clothes or "Like This"
Buy this food or "Like This"
Buy vacation at an episode location or "Like This"
Buy this book or "Like This"

Providing concomitant recommendations synchronized with currently watched media episode to other customers, marketers, media producers by linking of Semantic Media Layer Graph Entities and an accumulated data of the specific customer profile (e.g. as per specific subscription level), for example:

Show most popular searches/filters
Show most watched episodes
Show these products or "Like This" (fashion, etc.)

Figure 8:
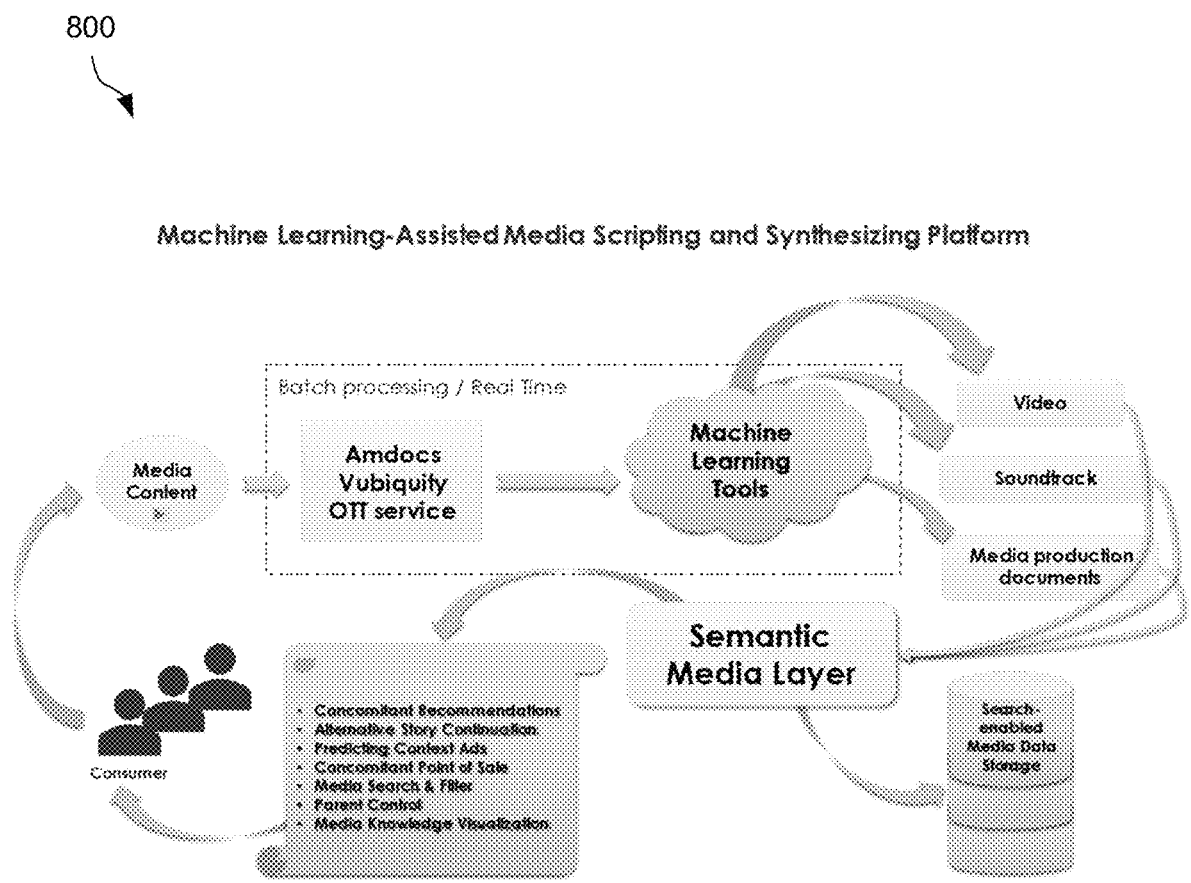
FIG. 8 illustrates a system for providing one or more creative media capability services, in accordance with one embodiment.

FIG. 8 illustrates a system 800 for providing one or more creative media capability services, in accordance with one embodiment. As an option, the system 800 may be implemented in the context of the details of the previous figure and/or any subsequent figure(s). Of course, however, the system 800 may be implemented in the context of any desired environment. Further, the aforementioned definitions may equally apply to the description below.

As shown, Amdocs Vubiquity may be extended to include a new media content service based on Media Scripting and Synthesizing Platform, which will use machine learning tools to obtain the raw data from media contents and to then form directed graphs from that raw data in a Semantic Media Layer. The directed graphs can then be used to provide one or more creative media capability services to consumers.

Figure 9:
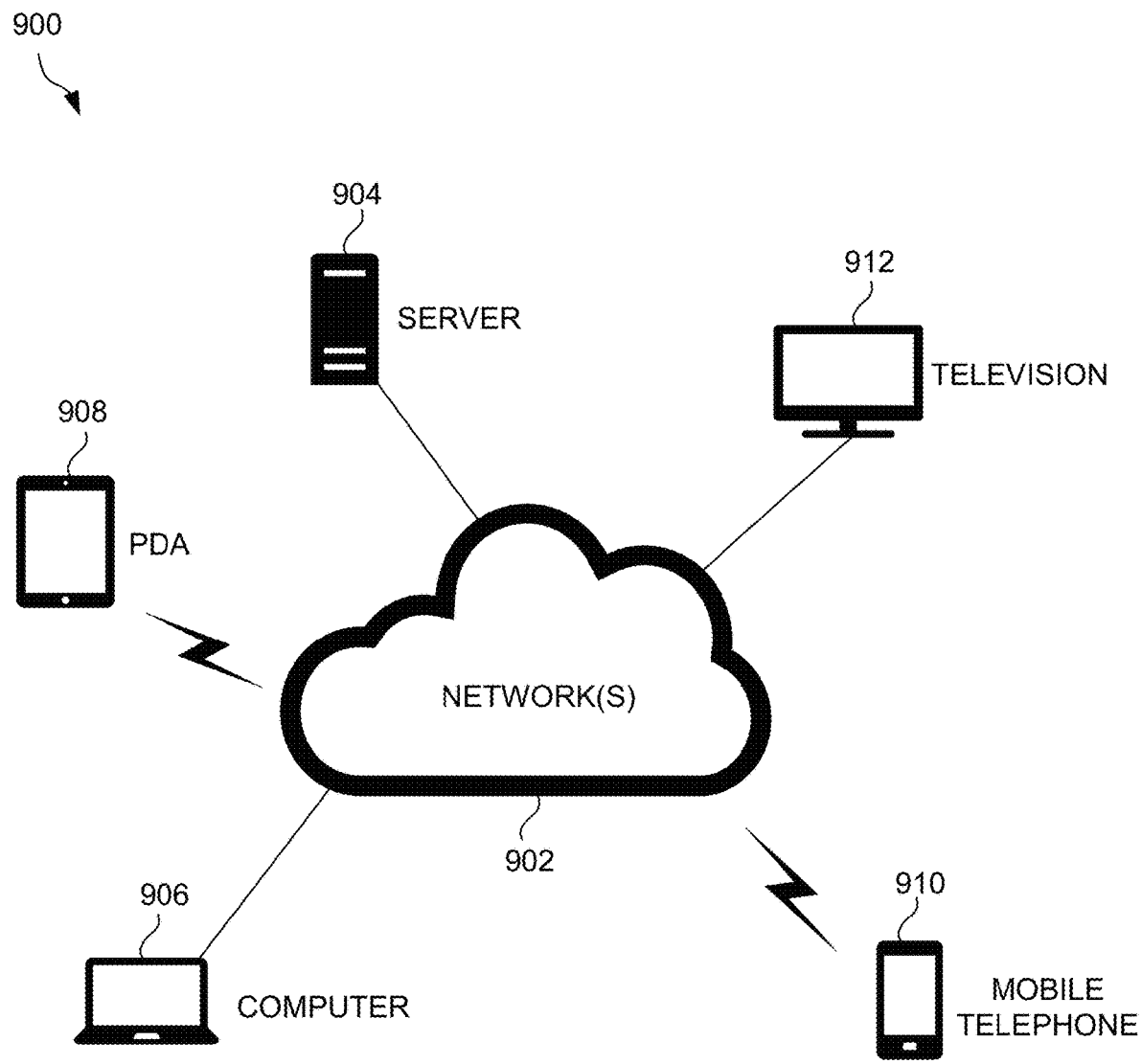
FIG. 9 illustrates a network architecture, in accordance with one possible embodiment.

FIG. 9 illustrates a network architecture 900, in accordance with one possible embodiment. As shown, at least one network 902 is provided. In the context of the present network architecture 900, the network 902 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 902 may be provided.

Coupled to the network 902 is a plurality of devices. For example, a server computer 904 and an end user computer 906 may be coupled to the network 902 for communication purposes. Such end user computer 906 may include a desktop computer, lap-top computer, and/or any other type of logic. Still yet, various other devices may be coupled to the network 902 including a personal digital assistant (PDA) device 908, a mobile phone device 910, a television 912, etc.

Figure 10:
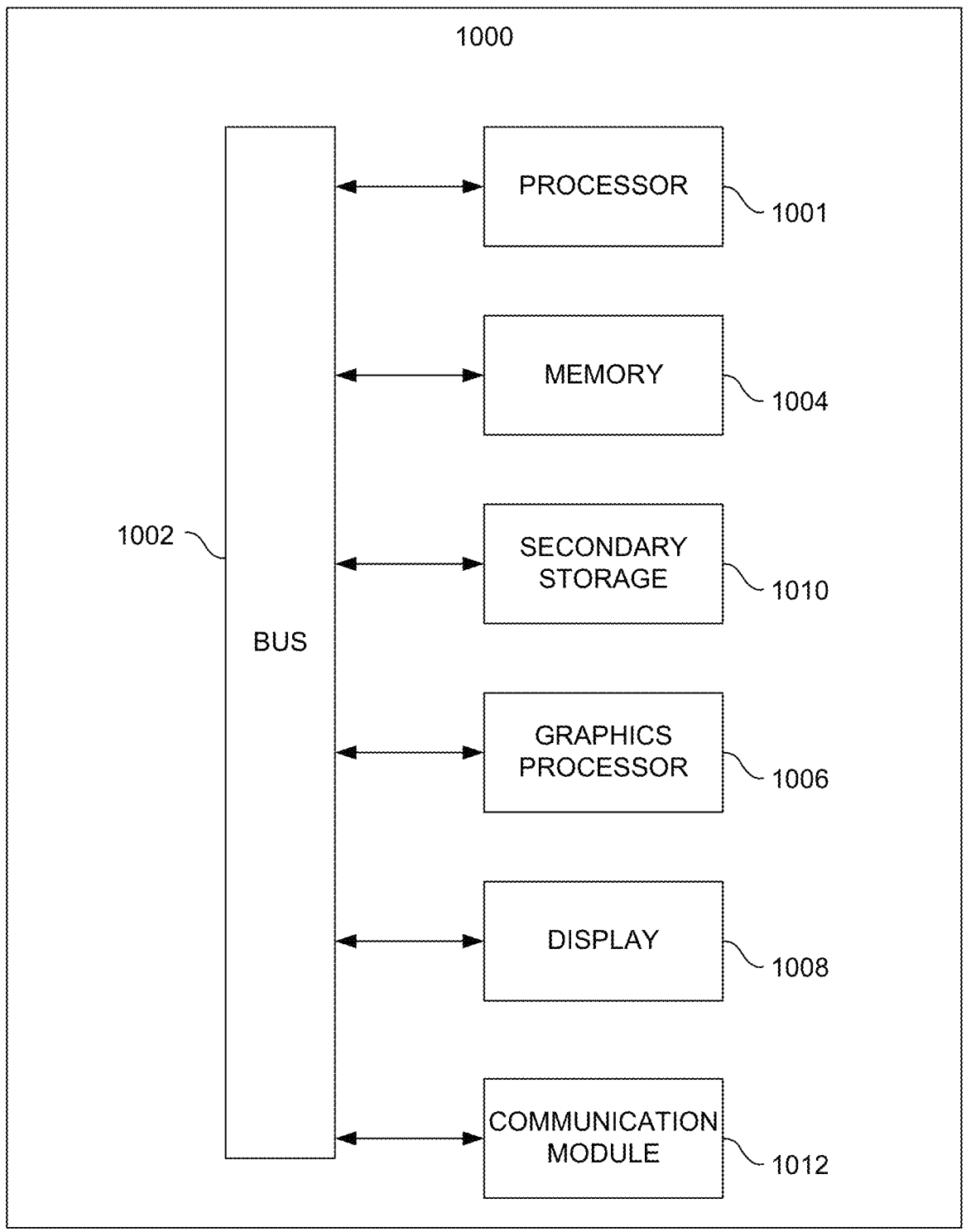
FIG. 10 illustrates an exemplary system, in accordance with one embodiment.

FIG. 10 illustrates an exemplary system 1000, in accordance with one embodiment. As an option, the system 1000 may be implemented in the context of any of the devices of the network architecture 900 of FIG. 9. Of course, the system 1000 may be implemented in any desired environment.

As shown, a system 1000 is provided including at least one central processor 1001 which is connected to a communication bus 1002. The system 1000 also includes main memory 1004 [e.g. random access memory (RAM), etc.]. The system 1000 also includes a graphics processor 1006 and a display 1008.

The system 1000 may also include a secondary storage 1010. The secondary storage 1010 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 1004, the secondary storage 1010, and/or any other memory, for that matter. Such computer programs, when executed, enable the system 1000 to perform various functions (as set forth above, for example). Memory 1004, storage 1010 and/or any other storage are possible examples of non-transitory computer-readable media.

The system 1000 may also include one or more communication modules 1012. The communication module 1012 may be operable to facilitate communication between the system 1000 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   parse a media content to determine raw data from the media content that indicates:
      features of the media content, and
      relationships between the features of the media content as determined from at least one of interactions between features within the media content or detection of features at a same timepoint in the media content;
   generate a directed graph from the raw data, wherein vertices of the directed graph correspond to the features of the media content and edges of the directed graph define the relationships between the features;
   provide the directed graph as input to one or more creative media capability services that use the directed graph to generate new content; and
   output the new content to one or more users.

2. The non-transitory computer-readable media of claim 1, wherein the media content is a media file.

3. The non-transitory computer-readable media of claim 1, wherein the media content is a media streams.

4. The non-transitory computer-readable media of claim 1, wherein the media content is one of a movie, a television episode, or an audible book.

5. The non-transitory computer-readable media of claim 1, wherein the features of the media content include one or more of:
   a personage,
   an object,
   a phrase,
   a location,
   an emotion,
   an intimacy,
   a concept,
   an event,
   a music, or
   a relationship.

6. The non-transitory computer-readable media of claim 1, wherein the media content is parsed using a plurality of different types of parsers each configured to detect one or more different types of features in the media content.

7. The non-transitory computer-readable media of claim 1, wherein the one or more creative media capability services execute on a single platform.

8. The non-transitory computer-readable media of claim 1, wherein the device is further caused to:
   index the directed graph,
      wherein at least one creative media capability service of the one or more creative media capability services uses the index.

9. The non-transitory computer-readable media of claim 1, wherein the one or more creative media capability services includes a search engine that provides searching and filtering of the media content, and wherein the new content includes search results generated by the search engine.

10. The non-transitory computer-readable media of claim 1, wherein the new content is a story timeline and its visualization generated for the media content.

11. The non-transitory computer-readable media of claim 1, wherein the one or more creative media capability services includes live filtering out of predefined content from the media content per a predefined filter setting, and wherein the new content is the media content with the predefined content removed.

12. The non-transitory computer-readable media of claim 1, wherein the new content is a new media content.

13. The non-transitory computer-readable media of claim 12, wherein the new media content is generated from the directed graph and at least one additional directed graph generated for at least one additional media content.

14. The non-transitory computer-readable media of claim 1, wherein the new content is a contraction of the media content.

15. The non-transitory computer-readable media of claim 1, wherein the new content is concomitant recommendations synchronized with the media content when currently watched.

16. The non-transitory computer-readable media of claim 1, wherein the new content is an alternative story continuation beginning from any point of a scenario in the media content.

17. The non-transitory computer-readable media of claim 1, wherein the device is further caused to:
   make the one or more creative media capability services accessible to a plurality of end users.

18. The non-transitory computer-readable media of claim 16, wherein making the one or more creative media capability services accessible to the plurality of end users includes:
   receiving, from an end user of the plurality of end users, a request for a creative media capability service of the one or more creative media capability services,
   providing the directed graph as input to the creative media capability service, and
   executing functionality of the creative media capability service to generate the new content for output to the end user.

19. A method, comprising:
   at a computer system:
   parsing a media content to determine raw data from the media content that indicates:
      features of the media content, and
      relationships between the features of the media content as determined from at least one of interactions between features within the media content or detection of features at a same timepoint in the media content;
   generating a directed graph from the raw data, wherein vertices of the directed graph correspond to the features of the media content and edges of the directed graph define the relationships between the features;

providing the directed graph as input to one or more creative media capability services that use the directed graph to generate new content; and outputting the new content to one or more users.

20. A system, comprising:

a non-transitory memory storing instructions; and one or more processors in communication with the non-transitory memory that execute the instructions to:

parse a media content to determine raw data from the media content that indicates:

features of the media content, and relationships between the features of the media content as determined from at least one of interactions between features within the media content or detection of features at a same timepoint in the media content;

generate a directed graph from the raw data, wherein vertices of the directed graph correspond to the features of the media content and edges of the directed graph define the relationships between the features;

provide the directed graph as input to one or more creative media capability services that use the directed graph to generate new content; and output the new content to one or more users.

* * * * *